US006408273B1

(12) United States Patent
Quagliaro et al.

(10) Patent No.: US 6,408,273 B1
(45) Date of Patent: Jun. 18, 2002

(54) METHOD AND DEVICE FOR THE PROCESSING OF SOUNDS FOR AUDITORY CORRECTION FOR HEARING IMPAIRED INDIVIDUALS

(75) Inventors: Gilles Quagliaro, Cormeilles en Parisis; Philippe Gournay, Asnieres; Frédéric Chartier, Paris; Gwenaël Guilmin, Suresnes, all of (FR)

(73) Assignee: Thomson-CSF, Paris (FR)

(*) Notice: Subject to any disclaimer, the term of this patent is extended or adjusted under 35 U.S.C. 154(b) by 0 days.

(21) Appl. No.: 09/453,085

(22) Filed: Dec. 2, 1999

(30) Foreign Application Priority Data

Dec. 4, 1998 (FR) ........................................... 98 15354

(51) Int. Cl.$^{7}$ ............................................... G01L 21/00
(52) U.S. Cl. .......................... 704/271; 704/270; 623/10
(58) Field of Search ................................ 704/207, 208, 704/214, 270, 220, 221, 230, 271; 623/10

(56) References Cited

U.S. PATENT DOCUMENTS 4,051,331 A 9/1977 Strong et al. ........... 179/107 R
4,716,362 A 12/1987 Ambos et al. ............ 324/77 B
4,791,672 A 12/1988 Nunley et al. ............ 381/68.2
5,737,719 A 4/1998 Terry ......................... 704/224
5,878,388 A * 3/1999 Nishiguchi et al. ......... 704/214
5,960,388 A * 9/1999 Nishiguchi et al. ......... 704/208
6,233,550 B1 * 5/2001 Gersho et al. .............. 704/208

FOREIGN PATENT DOCUMENTS

WO WO 96/16533 6/1996

* cited by examiner

*Primary Examiner*—Marsha D. Banks-Harold
*Assistant Examiner*—Susan McFadden
(74) *Attorney, Agent, or Firm*—Oblon, Spivak, McClelland, Maier & Neustadt, P.C.

(57) ABSTRACT

A method for providing auditory correction for a hearing-impaired individual, including extracting pitch, voicing, energy and spectrum characteristics of an input speech signal. The method also includes modifying the extracted pitch characteristic by multiplying a pitch factor times the extracted pitch characteristic, modifying the extracted voicing characteristic by multiplying a voicing factor times the extracted voicing characteristic, modifying the extracted energy characteristic by applying a compression function to the extracted energy characteristic, and modifying the extracted spectrum characteristic by applying a homothetical compression function to the extracted spectrum characteristic. Further, a speech signal is reconstituted perceptible to the hearing-impaired individual based on the modified pitch, voicing, energy and spectrum characteristics.

19 Claims, 3 Drawing Sheets

METHOD AND DEVICE FOR THE PROCESSING OF SOUNDS FOR AUDITORY CORRECTION FOR HEARING IMPAIRED INDIVIDUALS

BACKGROUND OF THE INVENTION

1. Field of the Invention

The present invention relates to a method and device for the correction of sounds for hearing-impaired individuals. It can be applied equally well to the making of auditory prosthetic devices as well as to software that can be executed on personal computers or telephone answering machines and more generally to any device designed to improve hearing comfort and the understanding of speech by persons affected by deafness.

The problem of deaf people essentially arises out of the specific and degraded nature of their auditory perception.

In his need to communicate, man since the dawn of time has constructed a mode of oral communication, namely speech, based on the mean characteristics of the production of sound signals (in the form of voice) and their perception (by the ear). Everyday language therefore is the language of the greatest number. By contrast, the hearing of the hearing-impaired person is far removed from the mean and everyday language hardly or even not at all accessible to him.

The understanding of everyday language is a prerequisite for the integration of a hearing-impaired person into his community. In what may be considered to be a reflex of social survival, any hearing-impaired individual is naturally left to construct a language of his own and implement methods, techniques and a strategy of communication that enable him to transpose the common language into his own specific language. A known spectacular example is that of lip-reading which enables access to normal speech through a visual alphabet of the position of the lips.

The twentieth century has seen a constant effort in the designing of machines designed to relieve hearing-impaired individuals and help them.

2. Description of the Prior Art

Two classes of machines have been developed.

A first class of machines deals with "light" deafness and is aimed at correcting hearing and making it as normal as possible. This is what done by the usual prosthetic devices that are widely available in the market.

A second class of machines pertains to more extreme cases of deafness and seeks to convert speech into synthetic speech accessible to the hearing-impaired person. In this category, most of the achievements relate to "heavily deaf individuals". A remarkable example is that of the cochlear implant which acts by means of electrodes applying direct stimulation to the auditory nerve.

The present invention seeks to propose a solution for persons suffering from what is known as "intermediate" deafness. These persons presently have no appropriate technical aids. They are far too afflicted to be helped by the usual forms of prosthesis but their auditory abilities are sufficient for them to be able to do without the devices used for people afflicted with heavy deafness.

The usual prosthetic devices generally implement a method of selective amplification of speech as a function of frequency. In its implementation, an automatic system for the regulation of the sound level acts on the amplification gain. The aim is to provide the best possible hearing comfort and protection against instantaneous power peaks.

For reasons of business strategy and in response to requests by patients, these prosthetic devices are miniaturized so that they can fit into the curve of the ear or be inserted therein, leading to relatively mediocre performance characteristics capable of providing only very approximate levels of auditory correction. Typically, only three frequency bands are defined for the frequency correction. These prosthetic devices, without doubt, deal with "light" deafness which is the most frequent type of deafness. Heavier deafness may be relieved but at the cost of painful disadvantages caused especially by the amplification of the background noise and by Larsen's phenomenon. Furthermore, there is no possibility of correction in the frequency zones for which there is no hearing.

In the history of prosthetic devices for heavy deafness, reference may be made to the work by J. M. TATO, Professor of E.N.T. medicine, and Mr. VIGNERON and Mr. LAMOTTE quoted in the article by J. C. LAFON, "Transposition et modulation" (Transposition and modulation), *Bulletin d'audiophonologie annales scientifiques de Franche Comté*, Vol. XII, No. 3 & 4, Monograph No. 164, 1996. These prosthetic devices exploit the fact that deaf people are rarely completely deaf and that a very small residue of perception persists, often in the low-pitched tones. It has often been attempted to put these facts to profitable use.

Thus, it is possible to very approximately restore a perception of sound to deaf people by what are called methods of "transposition" from the high-pitched tones to the low-pitched tones. Unfortunately, the understanding of language requires more than a simple perception, and it turns out to be the case that the transmission of intelligibility is inseparable from a necessary "richness" of the sound. Restoring this "richness" has become one of the main subjects of preoccupation. Thus, the creation of a synthesized speech has been envisaged in order to restore the structural elements that form the medium for the intelligibility of everyday language.

The techniques implemented in 1952 by J. M. TATO consisted in recording speech spoken very swiftly and then restoring it at half speed. This enabled a transposition by one octave towards the low-pitched tones while preserving the structure of the initial speech. Tests have shown that this has a certain advantage for deaf people.

However, the drawback of this method is that it can be used only in deferred time. The technique developed in 1971 by Mr. VIGNERON and Mr. LAMOTTE enables a <<real-time >> adaptation of this method, in which the time is cut up into intervals of 1/100 seconds with the elimination of one in every two intervals, J. M. TATO's method being applied to the remaining intervals. However, this system unfortunately has a high level of background noise.

The idea of building "natural" sounds is also present in a prosthetic device also known as "GALAXIE" in the article by J. C. LAFON. This prosthetic device implements a battery of filters and mixers distributed over six subbands and achieves a transposition into the low-pitched tones used for people afflicted with heavy deafness.

Unfortunately, these methods work at the level of the signal and have far too many distortions and far too much of hearing discomfort to be used by persons suffering from intermediate deafness.

The article by Mr. Jean Claude LAFON brings out three main guidelines that may be used to obtain efficient prosthetic treatment.

1—It appears to be important to be able to transpose the totality of the sound structure, namely to take the structural elements of speech that carry intelligibility into the zone of perception of the hearing-impaired individual.

2—It appears to be also important to produce "natural" sounds, namely to reproduce synthetic speech that carries information having a structure that is in harmony with the auditory capabilities of the hearing-impaired individual.

3—Finally it is necessary to ensure the preservation of the temporality of the speech signal, for rhythm is a carrier of information accessible to the hearing-impaired individual.

The original idea of the invention is to overcome the above-mentioned drawbacks by using a parametrical model of the speech signal capable of making relevant conversions in order to achieve auditory correction for hearing-impaired individuals in implementing a method capable of meeting the three constraints referred to here above.

SUMMARY OF THE INVENTION

To this end, an object of the invention is a method to provide auditory correction for hearing-impaired individuals that consists in extracting the parameters characterizing the speech, the voicing, the energy and the spectrum of the speech signal, modifying the parameters to make the speech intelligible to a hearing-impaired individual and reconstructing a speech signal perceptible to the hearing-impaired individual by means of the modified parameters.

An object of the invention is also a device for the implementing of the above-mentioned method.

The method and device according to the invention have the advantage of implementing the parametrical models that are commonly used in vocoders in order to adapt them to hearing by hearing-impaired individuals. This makes it possible to work no longer at the level of the sound signal as is done in the prior art techniques but at the level of the symbolic structure of the speech signal in order to preserve its intelligibility. The vocoders indeed have the advantage of using an alphabet that incorporates the notions of "pitch", "spectrum", "voicing", and "energy" which are very close to the physiological model of the mouth and the ear. By virtue of Shannon's theory, the information transmitted is then truly a carrier of the intelligibility of speech. The concrete representation of the intelligibility of speech in computer form thus opens new prospects. Intelligibility may thus be acquired during the operation of analysis and is restored during the synthesis.

Through the invention, the operation of synthesis of a parametrical vocoder may thus be matched with the auditory characteristics of hearing-impaired individuals persons. This technique, associated with more conventional methods, makes it possible to envisage a particularly general method of prosthesis that can serve a very wide population, especially people suffering from intermediate deafness.

Another advantage of the method and device of the invention is that it provides great freedom in the settings, each parameter being modified independently of the others without any reciprocal impact, with a specific setting for each ear.

BRIEF DESCRIPTION OF THE DRAWINGS

Other features and advantages of the invention shall appear from the following description, made with reference to the appended drawings, of which.

MORE DETAILED DESCRIPTION

The method for the processing of speech signals according to the invention is based on a parametrical modelling of the speech signal of the type commonly implemented in the techniques for making HSX digital vocoders, as described in the article by P. Gournay, F. Chartier, "A 1200 bits/s HSX speech coder for very low bit rate communications", published in the IEEE Proceedings Workshop on Signal Processing System (Sips'98), Boston, Oct. 8–1998.

Figure 1:
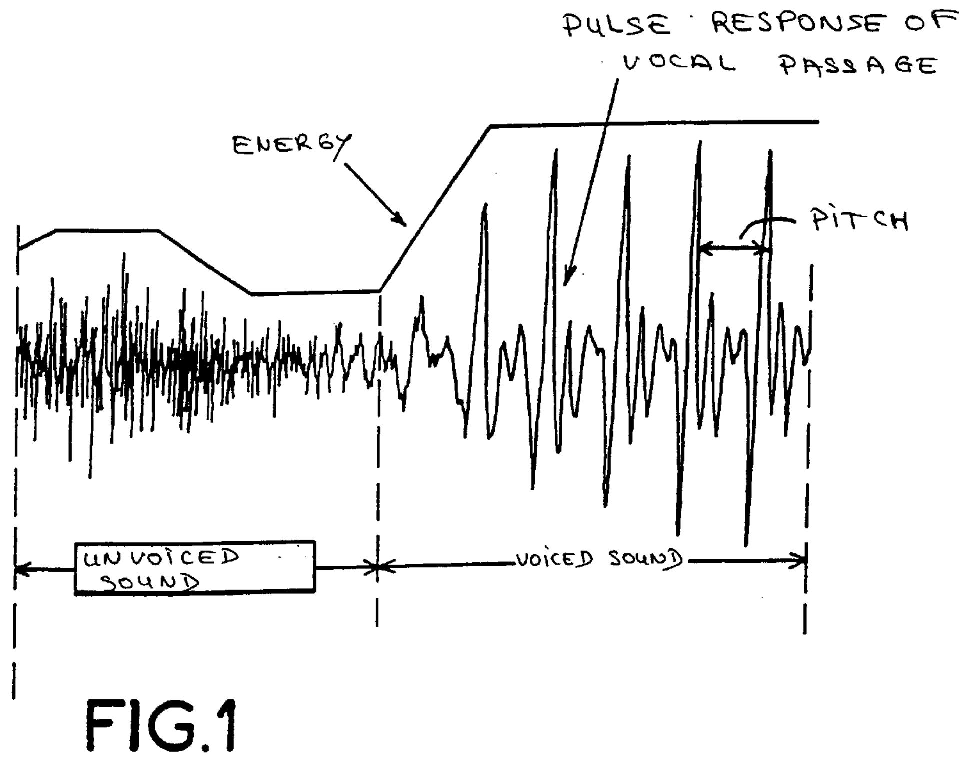
FIG. 1 shows the parameters of the modelling of the speech signal used in the implementation of the invention.

This model is defined chiefly by four parameters shown in FIG. 1:

- a voicing parameter that describes the varyingly periodic character of the voice sounds or random character of the unvoiced sounds of the speech signal,
- a parameter defining the fundamental frequency or "PITCH" of the voiced sounds,
- a parameter representing the temporal progress of the energy,
- and a parameter representing the spectral envelope of the speech signal.

The spectral envelope of the signal or "spectrum" may be obtained by a self-regressive modelling using a linear prediction filter or a short-term Fourier analysis synchronous with the pitch. These four parameters are estimated periodically on the speech signal, one or more times per frame depending on the parameter, for a frame period typically ranging form 10 to 30 ms.

Figure 2:
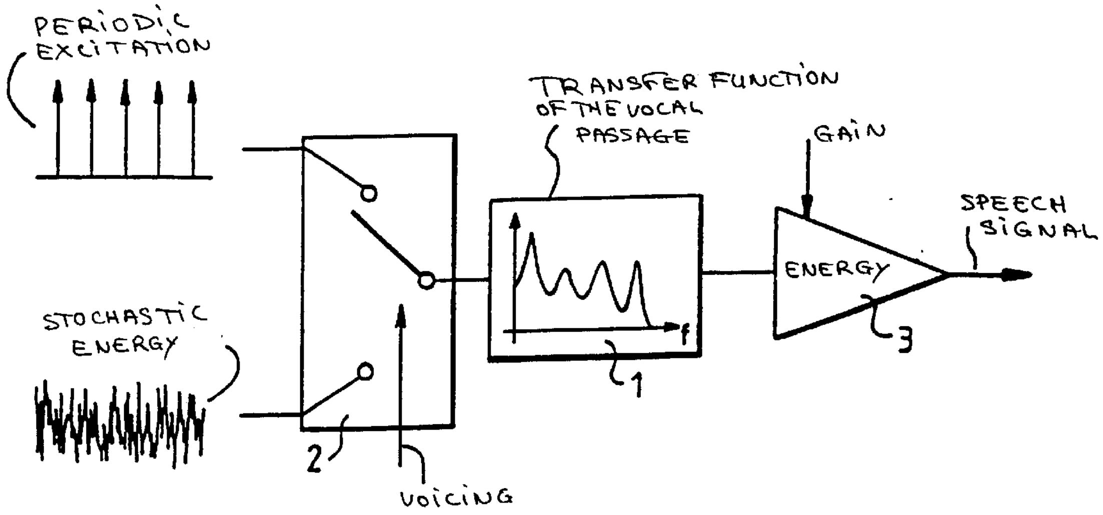
FIG. 2 is a parametrical model of production of the speech signal.

The restitution of the speech signal is done as shown in FIG. 2, using the pitch or a stochastic noise to excite a digital synthesis filter 1 which, by its transfer function, modelises the vocal passage depending respectively on whether the sound is voiced or not voiced.

A selector switch 2 provides for the transmission of the pitch or of the noise to the input of the synthesis filter 1.

An amplifier 3 with variable gain as a function of the energy of the speech signal is placed at output of the synthesis filter 1.

Figure 3:
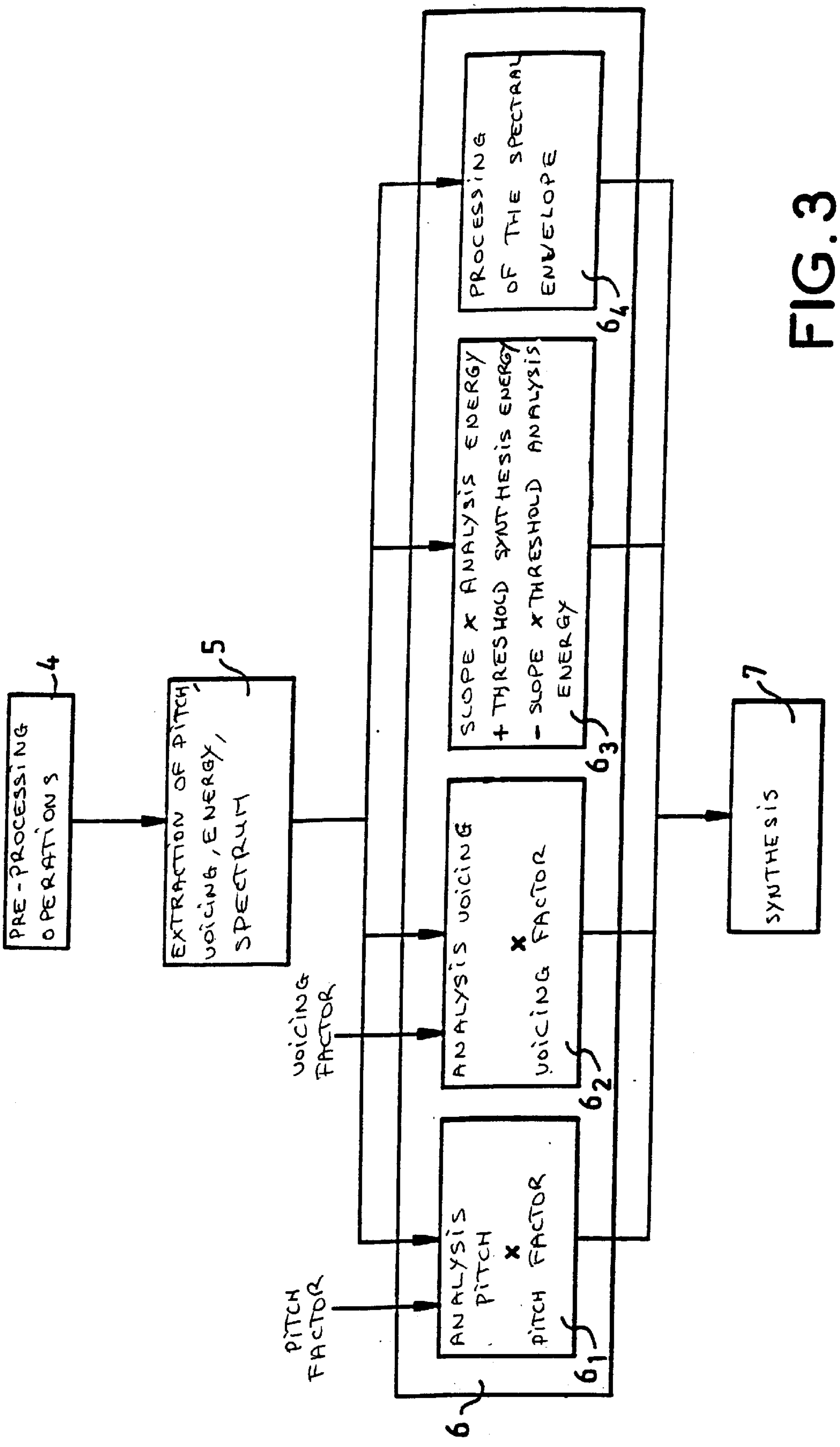
FIG. 3 shows the different steps needed to implement the method according to the invention in the form of a flow chart.

In the case of a simple parametrical model comprising a binary decision between a voiced sound and an unvoiced sound, the procedure of synthesis may be summed up in the procedure shown in FIG. 2. However, the method according to the invention as shown in FIG. 3 in the form of a flow chart is more complicated and occurs in four steps that can be subdivided into a pre-processing step 4, a step 5 for the analysis of the signal obtained in the step 4 to extract the parameters characterizing the pitch, voicing, energy and spectrum of the speech signal, a step 6 during which the parameters obtained in step 5 are modified and a step 7 for the synthesis of a speech signal formed out of the parameters modified in the step 6.

The step 4 is the one commonly implemented in the vocoders. It consists, for example, after the conversion of the speech signal into a digital signal, in reducing the background noise by using for example the method described by Mr. D. Malah, "Speech Enhancement Using A Minimum Square Error Short Time Spectral Amplitude Estimator", in IEEE Transactions, Acoustic Speech Processing, Vol. 12, No. 6, pp. 1109–1121, 1984, cancelling the acoustic echoes by using for example the method described in K. Murano, S. Unjani and F. Armano, "Echo Cancellation And Applications" in IEEE Com. May, 28 (1), pp. 49–55, January 1990, achieving an automatic gain control or, again, prestressing the signal.

The parametrical processing of the speech signal obtained at the end of the step 4 is done in the step 5. It consists in subdividing the speech signal into samples of a constant duration Tanalysis (typically 5 to 30 milliseconds) to perform, on each of them, the estimation of the parameters of the speech signal model. By using the HSX analysis model described in the article by M. Gournay and F. Chartier described here above, the pitch and the voicing are estimated every 22.5 milliseconds. The voicing information is given in the form of a transition frequency between a voice bass frequency band and an unvoiced treble frequency band. The energy of the signal is estimated every 5.625 milliseconds. During the unvoiced periods of the signal, this energy is estimated on a duration of 45 samples (5.625 ms) and expressed in dB per sample. During the voiced periods of the signal, it is estimated on an integer number of fundamental periods at least equal to 45 and expressed in dB per sample. The spectral envelope S(co) is estimated very 11.25 milliseconds. It is obtained by linear prediction (LPC) by a self-regressive modelling of an OLPC=16 order transfer function filter:

$$S(\omega)=1/|A(z)|^2$$

with z=exp(jω)

and ω=2πf where A(z) is defined by:

$$A(z) = 1 + \sum_{k=1}^{olpc} LpcAnalysis\,[k]z^{-k}.$$

Hereinafter, the parameters derived from the analysis are referenced:

AnalysisPitch;

AnalysisVoicing;

AnalysisEnergy[i], i=0 to 3;

AnalysisLpc[k], k=1 to 16.

The method of synthesis consists, for each time interval Tanlaysis, in stimulating the synthesis filter giving S(ω) by the weighted sum in frequency (low band/high band defined by the voicing frequency) of a pseudo-random white noise for the high band and a Dirac comb periodic signal at a fundamental frequency equal to the pitch for the low band.

According to the invention, many operations of conversion can be applied to the parameters derived from the analysis of the step 5. Each parameter indeed may be modified independently of the others without any reciprocal interaction. Furthermore, these conversions may be constant or activated only under particular conditions (for example activation of the modification of the spectral envelope for certain configurations of distribution of energy as a function of frequency, . . . ).

These modifications are performed at the steps $\mathbf{6}_1$ to $\mathbf{6}_4$ and they relate essentially to the value of the pitch characterizing the fundamental frequency, the voicing, the energy and the spectral envelope.

For the running of step $\mathbf{6}_1$, any conversion defining a new value of "pitch" from the value of the analysis pitch obtained in step 5 is applicable.

The elementary conversion is homothetical and defined by the relationship:

SynthesisPitch=AnalysisPitch*Pitch Factor with the following limitations:

0.25<PitchFactor<4.0

50 Hz<SynthesisPitch<400 Hz

The factor PitchFactor can be adjusted for the type of deafness considered.

As in the case of the pitch, the voicing frequency may be modified by any conversion defining a "voicing frequency" for each value of the voicing frequency analyzed in the step 5.

In the exemplary implementation of the invention, the conversion chosen is homothetical and defined by the relationship:

VoicingSynthesis=AnalysisVoicing*VoicingFactor with the following limitations:

0.25<VoicingFactor<4.0

0 Hz<SynthesisVoicing<4000 Hz

When the voicing transition frequency coming from the AnalysisVoicing analysis is the maximum (with the signal being entirely voiced, AnalysisVoicing=MaximumVoicing), the voicing frequency used in synthesis is unchanged (VoicingSynthesis=MaximumVoicing). To apply a multiplier factor to it would indeed be totally arbitrary (AnalysisVoicing=MaximumVoicing does not mean an absence of voicing above the MaximumVoicing). For example, MaximumVoicing may be fixed at 3625 Hz.

The factor VoicingFactor is adjustable for the type of deafness considered.

Figure 4:
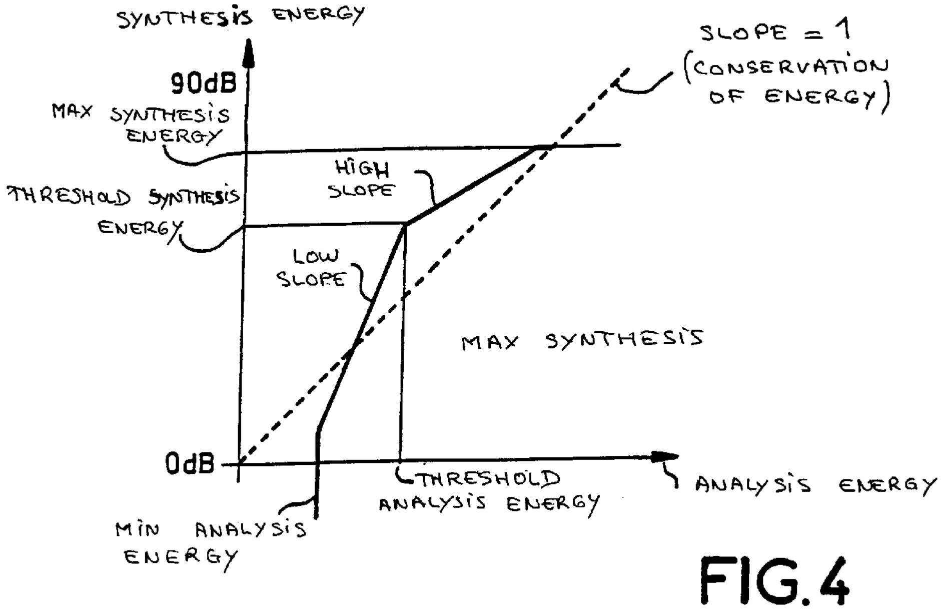
FIG. 4 is a curve of the conversion, during the synthesis of the speech signal, of the energy of the speech signal measured during the process of analysis of the speech signal.

The processing of the energy is done in the step $\mathbf{6}_3$. As above, any conversion defining energy from the energy of the speech signal analyzed with the step $\mathbf{6}_3$ is applicable. In the example described here below, the method according to the invention applies a compression function with four linear segments to the energy as shown in the graph of FIG. 4.

The energy used in synthesis is given by the relationship:

SynthesisEnergy[i]=Slope*AnalysisEnergy[i]+ThresholdSynthesisEnergy–Slope*ThresholdAnalysisEnergy, for i=0 to 3 with Slope=LowSlope for AnalysisEnergy<ThresholdAnalysisEnergy;

Slope=HighSlope for AnalysisEnergy>=ThresholdAnalysisEnergy;

and with the following limitations:

SynthesisEnergy<=MaxSynthesisEnergy;

SynthesisEnergy=–Infinite for AnalysisEnergy<MinAnalysisEnergy.

The parameters of the processing operations, MinAnalysisEnergy, MaxEnergySynthesis, LowSlope, HighSlope and ThresholdSynthesisEnergy are adjustable for the type of deafness considered.

The processing of the spectral envelope takes place in the step $\mathbf{6}_4$. In this step, any conversion defining a spectrum S'(ω) from the spectrum S(ω) analyzed in the step 5 is applicable.

In the embodiment of the invention described here below, the elementary conversion of the spectrum that is implemented is a homothetical compression of the scale of the frequency.

The scale of the frequencies is compressed by a factor SpectrumFactor so that the useful bands before and after the processing are respectively equal to [O . . . FECH/2] and [O . . . FECH/(2*SpectrumFactor)] where FECH is the sampling frequency of the system.

The implementation of this homothetical compression is very simple when the compression factor is an integer value. It is then enough to replace z by $z^{SpectrumFactor}$ in the expression of the poles of the synthesis filter and then apply a lowpass filtering to the synthesized signal with a cutoff frequency FECH/(2*SpectrumFactor).

A first theoretical justification of the validity of the method described here above consists in saying that this operation is equivalent to carrying out an oversampling by a factor SpectrumFactor of the pulse response of the vocal passage, by the insertion of SpectrumFactor-1 zero samples between each sample of the pulse response of the original voice conduit and then by lowpass filtering of the synthesized signal with a cutoff frequency equal to FECHI (2*SpectrumFactor).

A second theoretical justification consists in assuming that this operation is equivalent to duplicating and shifting the poles of the transfer function.

Indeed, assuming that the single-pole OLPCs referenced zi=pi.exp(2iπFi) of the transfer function 1/A(z), the "SpectrumFactor*OLPC poles" of $1/A(z^{SpectrumFactor})$ are then the complex "SpectrumFactor" roots of each of the zi values. The poles preserved by the lowpass filtering operation are of the $z'i=p^{i}|/^{SpectrumFactor}$ exp(2.i.π.Fi/SpectrumFactor) type which shows that their resonance frequency has really undergone a homothetical compression by a factor "SpectrumFactor".

The filter LPC used in synthesis may therefore be expressed in the form:

$$B(z) = 1 + \sum_{k=1}^{olpc2} LpcSynthesis\, e[k]^{-k} \text{ with:}$$

OLPC2=SpectrumFactor*OLPC;

LpcSynthesis[k]=0 for k=1 at OLPC2, k being a non-multiple of SpectrumFactor.

LpcSynthesis [SpectrumFactor*k]=AnalysisLpc[k] for k=1 at OLPC.

It is possible to restrict the compression factor of the spectral envelope so that it is an integer ranging from 1 to 4 such that:

1<SpectrumFactor<4.

The speech restored in the step 7 may again be accelerated or slowed down by a simple modification of the duration of the time interval taken into account for the synthesis phase.

In practice, this operation may take place by implementing a procedure of homothetical conversion defined by the relationship:

Tsynthesis=Tanalysis*TimeFactor

If TimeFactor>1, then this is a slowing down of speech. If TimeFactor<1, then this is an acceleration of speech.

In addition to the above processing operations, a number of post-processing operations may be envisaged. These consist for example in performing a bandpass filtering and a linear equalization of the synthesized signal or again a multiplexing of the sound in both ears.

The aim of the equalizing operation is to compensate for the audiogram of the patient by amplifying or attenuating certain frequency bands. In the framework of the prototype, the gain at seven frequencies (0, 125, 250, 500, 1000, 2000 and 4000 Hz) may be adjusted in time between −80 and +10 dB according to the patient's needs or the specific qualities of his audiogram. This operation may be performed for example by filtering by a fast Fourier transform (FFT) as described in M. D. Elliott, "Handbook of digital signal processing", Academic Press, 1987.

The multiplexing operation enables a monophonic restitution (for example a signal processed alone) or stereophonic restitution (for example a processed signal on one channel and an unprocessed signal on another channel). The stereophonic restitution enables the hearing-impaired individual to adapt the processing for each of his ears (with two linear equalizers to compensate for two different audiograms for example) and if necessary to keep intact, in one ear, a form of signal to which he is accustomed and which he can use, for example for getting into synchronism.

Figure 5:
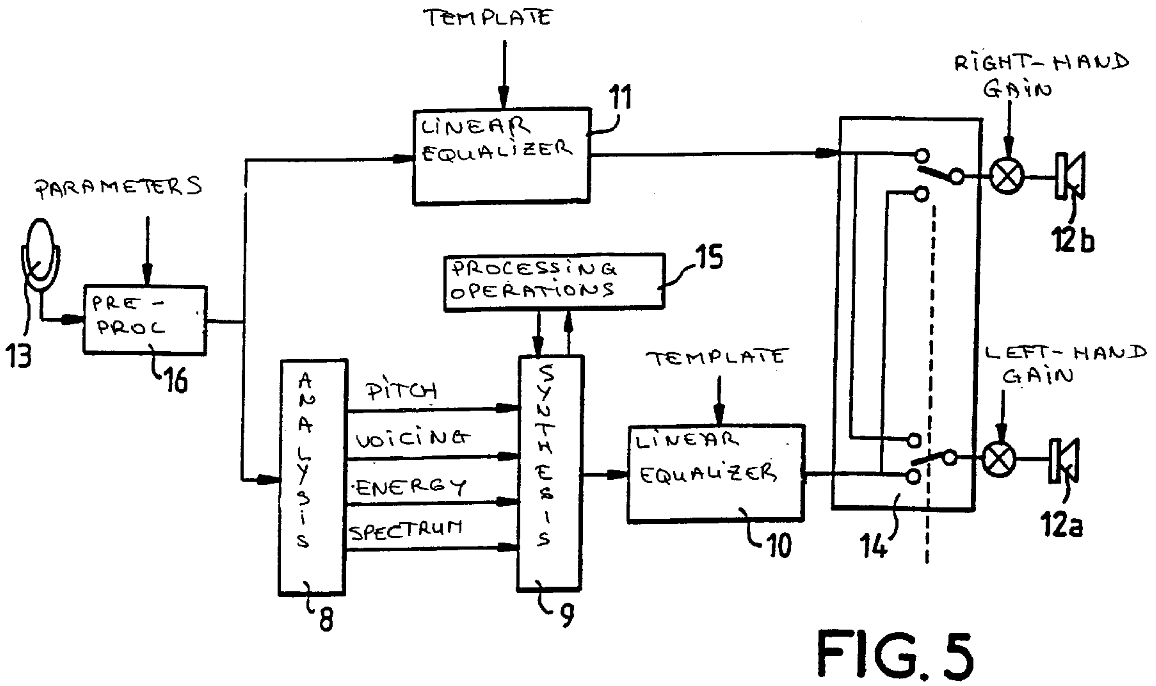
FIG. 5 is an embodiment of a device for the implementation of the method of the invention.

The device for the implementation of the method according to the invention shown in FIG. 5 has a first channel consisting of an analysis device 8, a synthesis device 9 and a first equalizer 10 and a second channel comprising a second equalizer 11, the set of two channels being coupled between a sound pick-up device 13 and a pair of listeners $12_a$, $12_b$. The analysis device 8 and the synthesis device 9 may be implemented by using known techniques for making vocoders, and especially for making the above-mentioned HSX vocoders. The outputs of the equalizers of the two channels are multiplexed by a multiplexer 14 to enable the restitution of its monophonic or stereophonic sound. A processing device 15 formed by a microprocessor or any equivalent device is coupled to the synthesis device 9 to modify the parameters given by the analysis device 8.

A pre-processing device 16 interposed between the sound pick-up device 13 and each of the two channels provides for the noise removal and the conversion of the speech signal into digital samples. The noise-cleared digital samples are applied respectively to the input of the equalizer 11 and the input of the analysis device 8.

According to other embodiments of the device according to the invention, the processing device 15 may be integrated into the synthesis device 9 since it is also possible to integrate all the operations of analysis and synthesis into one and the same software that can be executed on a personal computer or on a telephone-answering machine for example.

What is claimed is:

1. A method for providing auditory correction for a hearing-impaired individual, comprising:

extracting pitch, voicing, energy and spectrum characteristics of an input speech signal;

modifying the extracted pitch characteristic by multiplying a pitch factor times the extracted pitch characteristic;

modifying the extracted voicing characteristic by multiplying a voicing factor times the extracted voicing characteristic;

modifying the extracted energy characteristic by applying a compression function to the extracted energy characteristic;

modifying the extracted spectrum characteristic by applying a homothetical compression function to the extracted spectrum characteristic; and reconstituting a speech signal perceptible to the hearing-impaired individual based on the modified pitch, voicing, energy and spectrum characteristics, wherein the pitch, voicing, energy and spectrum characteristics are modified independently of each other without any reciprocal interaction and are tailored to the hearing-impaired individual.

2. The method according to claim 1, further comprising:

accelerating or slowing down the reconstituted speech signal by modifying a duration of a time interval used in reconstituting the speech signal.

3. The method according to claim 1, further comprising:

converting the input speech signal to a digital speech signal; and removing background noise from the digital speech signal prior to the extracting step.

4. The method according to claim 1, wherein the pitch and voicing factors are greater than 0.25 and less than 4.0.

5. A system for providing auditory correction for a hearing-impaired individual, comprising:

means for extracting pitch, voicing, energy and spectrum characteristics of an input speech signal;

means for modifying the extracted pitch characteristic by multiplying a pitch factor times the extracted pitch characteristic;

means for modifying the extracted voicing characteristic by multiplying a voicing factor times the extracted voicing characteristic;

means for modifying the extracted energy characteristic by applying a compression function to the extracted energy characteristic;

means for modifying the extracted spectrum characteristic by applying a homothetical compression function to the extracted spectrum characteristic; and means for reconstituting a speech signal perceptible to the hearing-impaired individual based on the modified pitch, voicing, energy and spectrum characteristics, wherein the pitch, voicing, energy and spectrum characteristics are modified independently of each other without any reciprocal interaction and are tailored to the hearing-impaired individual.

6. The system according to claim 5, further comprising:

means for accelerating or slowing down the reconstituted speech signal by modifying a duration of a time interval used in reconstituting the speech signal.

7. The system according to claim 5, further comprising:

means for converting the input speech signal to a digital speech signal; and means for removing background noise from the digital speech signal prior to the extracting means extracting the pitch, voicing, energy and spectrum characteristics.

8. The system according to claim 5, wherein the pitch and voicing factors are greater than 0.25 and less than 4.0.

9. An apparatus for providing auditory correction for a hearing-impaired individual, comprising:

an analysis device configured to extract pitch, voicing, energy and spectrum characteristics of an input speech signal; and a synthesis device including a processor and configured to modify the extracted pitch characteristic by multiplying a pitch factor times the extracted pitch characteristic, to modify the extracted voicing characteristic by multiplying a voicing factor times the extracted voicing characteristic, to modify the extracted energy characteristic by applying a compression function to the extracted energy characteristic, to modify the extracted spectrum characteristic by applying a homothetical compression function to the extracted spectrum characteristic, and to reconstitute a speech signal perceptible to the hearing-impaired individual based on the modified pitch, voicing, energy and spectrum characteristics, wherein synthesis device modifies the pitch, voicing, energy and spectrum characteristics independently of each other without any reciprocal interaction and are tailored to the hearing-impaired individual.

10. The apparatus according to claim 9, wherein the synthesis device accelerates or slows down the reconstituted speech signal by modifying a duration of a time interval used in reconstituting the speech signal.

11. The apparatus according to claim 9, further comprising:

a pre-processing device configured to convert the input speech signal to a digital speech signal, and to remove background noise from the digital speech signal prior to the analysis device extracting the pitch, voicing, energy and spectrum characteristics.

12. The apparatus according to claim 9, wherein the pitch and voicing factors are greater than 0.25 and less than 4.0.

13. The apparatus according to claim 11, further comprising:

a microphone configured to pick-up sounds to be input to the pre-processing device; and at least one speaker configured to present the reconstituted speech signal to the hearing-impaired individual.

14. A method for providing auditory correction for a hearing-impaired individual, comprising:

converting an input speech signal to a digital speech signal;

removing background noise from the digital speech signal;

extracting pitch, voicing, energy and spectrum characteristics of the input speech signal;

modifying the extracted pitch characteristic by multiplying a pitch factor times the extracted pitch characteristic;

modifying the extracted voicing characteristic by multiplying a voicing factor times the extracted voicing characteristic;

modifying the extracted energy characteristic by applying a compression function to the extracted energy characteristic;

modifying the extracted spectrum characteristic by applying a homothetical compression function to the extracted spectrum characteristic;

reconstituting a speech signal perceptible to the hearing-impaired individual based on the modified pitch, voicing, energy and spectrum characteristics; and accelerating or slowing down the reconstituted speech signal by modifying a duration of a time interval used in reconstituting the speech signal, wherein the pitch and voicing factors are greater than 0.25 and less than 4.0.

15. A system for providing auditory correction for a hearing-impaired individual, comprising:

means for converting an input speech signal to a digital speech signal;

means for removing background noise from the digital speech signal;

means for extracting pitch, voicing, energy and spectrum characteristics of the input speech signal;

means for modifying the extracted pitch characteristic by multiplying a pitch factor times the extracted pitch characteristic;

means for modifying the extracted voicing characteristic by multiplying a voicing factor times the extracted voicing characteristic;

means for modifying the extracted energy characteristic by applying a compression function to the extracted energy characteristic;

means for modifying the extracted spectrum characteristic by applying a homothetical compression function to the extracted spectrum characteristic;

means for reconstituting a speech signal perceptible to the hearing-impaired individual based on the modified pitch, voicing, energy and spectrum characteristics; and means for accelerating or slowing down the reconstituted speech signal by modifying a duration of a time interval used in reconstituting the speech signal, wherein the pitch and voicing factors are greater than 0.25 and less than 4.0.

16. An apparatus for providing auditory correction for a hearing-impaired individual, comprising:

a pre-processing device configured to convert the input speech signal to a digital speech signal, and to remove background noise from the digital speech signal prior to the analysis device extracting the pitch, voicing, energy and spectrum characteristics;

an analysis device configured to extract pitch, voicing, energy and spectrum characteristics of an input speech signal; and a synthesis device including a processor and configured to modify the extracted pitch characteristic by multiplying a pitch factor times the extracted pitch characteristic, to modify the extracted voicing characteristic by multiplying a voicing factor times the extracted voicing characteristic, to modify the extracted energy characteristic by applying a compression function to the extracted energy characteristic, to modify the extracted spectrum characteristic by applying a homothetical compression function to the extracted spectrum characteristic, and to reconstitute a speech signal perceptible to the hearing-impaired individual based on the modified pitch, voicing, energy and spectrum characteristics, wherein the synthesis device accelerates or slows down the reconstituted speech signal by modifying a duration of a time interval used in reconstituting the speech signal, and wherein the pitch and voicing factors are greater than 0.25 and less than 4.0.

17. A method for providing auditory correction for a hearing-impaired individual, comprising:

extracting pitch, voicing, energy and spectrum characteristics of an input speech signal;

modifying the extracted pitch characteristic by multiplying a pitch factor times the extracted pitch characteristic;

modifying the extracted voicing characteristic by multiplying a voicing factor times the extracted voicing characteristic;

modifying the extracted energy characteristic by applying a energy factor to the extracted energy characteristic;

modifying the extracted spectrum characteristic by applying a spectrum factor to the extracted spectrum characteristic; and reconstituting a speech signal perceptible to the hearing-impaired individual based on the modified pitch, voicing, energy and spectrum characteristics.

18. A system for providing auditory correction for a hearing-impaired individual, comprising:

means for extracting pitch, voicing, energy and spectrum characteristics of an input speech signal;

means for modifying the extracted pitch characteristic by multiplying a pitch factor times the extracted pitch characteristic;

means for modifying the extracted voicing characteristic by multiplying a voicing factor times the extracted voicing characteristic;

means for modifying the extracted energy characteristic by applying an energy factor to the extracted energy characteristic;

means for modifying the extracted spectrum characteristic by applying a spectrum factor to the extracted spectrum characteristic; and means for reconstituting a speech signal perceptible to the hearing-impaired individual based on the modified pitch, voicing, energy and spectrum characteristics.

19. An apparatus for providing auditory correction for a hearing-impaired individual, comprising:

an analysis device configured to extract pitch, voicing, energy and spectrum characteristics of an input speech signal; and a synthesis device including a processor and configured to modify the extracted pitch characteristic by multiplying a pitch factor times the extracted pitch characteristic, to modify the extracted voicing characteristic by multiplying a voicing factor times the extracted voicing characteristic, to modify the extracted energy characteristic by applying an energy factor to the extracted energy characteristic, to modify the extracted spectrum characteristic by applying a spectrum factor to the extracted spectrum characteristic, and to reconstitute a speech signal perceptible to the hearing-impaired individual based on the modified pitch, voicing, energy and spectrum characteristics.

* * * * *